United States Patent [19]

Okubo

[11] Patent Number: 4,515,115
[45] Date of Patent: May 7, 1985

[54] INERTIA SUPERCHARGER FOR INTERNAL COMBUSTION ENGINES

[75] Inventor: Junpei Okubo, Oyama, Japan

[73] Assignee: Kabushiki Kaisha Komatsu Seisakusho, Tokyo, Japan

[21] Appl. No.: 364,030

[22] Filed: Mar. 31, 1982

[30] Foreign Application Priority Data

Oct. 3, 1980 [JP] Japan .............................. 55-140451

[51] Int. Cl.³ ............................................. F02B 75/22
[52] U.S. Cl. ............................ 123/52 M; 123/52 MB
[58] Field of Search ....................... 123/52 M, 52 MB

[56] References Cited

U.S. PATENT DOCUMENTS 2,835,235  5/1958  Gassmann ..................... 123/52 M
3,177,854  4/1965  Garcea ......................... 123/52 M
4,300,488 11/1981  Cser ............................. 123/52 M

FOREIGN PATENT DOCUMENTS 57-7774  2/1982  Japan .

Primary Examiner—Craig R. Feinberg
Attorney, Agent, or Firm—Armstrong, Nikaido, Marmelstein & Kubovcik

[57] ABSTRACT

An inertia supercharger for an internal combustion engine which is made compact in size yet provides an efficient supercharging effect. An intake manifold comprising a plurality of pipes is provided along the inner periphery of a surge tank, one end of each pipe being open into the surge tank and the other end protruding from the surge tank and being connected to respective intake ports formed in a cylinder head.

2 Claims, 3 Drawing Figures

4,515,115

INERTIA SUPERCHARGER FOR INTERNAL COMBUSTION ENGINES

BACKGROUND OF THE INVENTION

This invention relates to an improvement in an inertia supercharger for use in multi-cylinder internal combustion engines.

In the multi-cylinder internal combustion engines such as diesel engines, there has heretofore been employed an inertia supercharger wherein the air intake ports of the engine are fitted with an air intake manifold and the dynamic effect or inertia of the air supplied through the air intake manifold is utilized to increase the amount of the air supplied into the cylinders thereof.

The length of the above-mentioned air intake manifold may depend on such factors as the cylinders volume, the timing of actuation of air intake and exhaust valves, the sectional area of the air intake manifold and the number of revolutions of the engine to be tuned with the operation of the supercharger and may be approximately obtained by the following formula:

$$\gamma = \frac{a}{2\pi} \sqrt{\frac{F_{pip}}{V_h \times l}}$$

where $\gamma$ is the frequency of the air supplied into the intake manifold; a is the velocity of the sound in the supplying air; $F_{pip}$ is the inner sectional area of the air intake manifold; $V_h$ is the effective volume of the cylinder; and l is the length of the air intake manifold including the air intake ports.

In order to obtain a significant inertia effects, it is required to satisfy the following formula:

$$\nu = 6 \frac{N_e}{\theta_s}$$

where $N_e$ is the rotational speed of the engine and $\theta_s$ is the effective opening angle of the air intake valve.

Regarding the inner sectional area of the air intake manifold $F_{pip}$, its proper range of values can be obtained by optimizing the mean velocity of the air supplied through the intake manifold at or around the tuned engine speed. The mean velocity of the air drawn through the intake manifold can be obtained by the following formula:

$$V_a = \frac{S \cdot N_e}{30} \times \frac{F_{pis}}{F_{pip}}$$

where $V_a$ is the mean velocity of the air flow through the intake manifold; S is the stroke of the piston; and $F_{pis}$ is the sectional area of the piston. In the vicinity of the number of revolutions of the engine to be tuned with the operation of the supercharger, the value of $V_a$ should preferably be 50 to 60 meters per second and the inner sectional area of the air intake manifold $F_{pip}$ is determined so that $V_a$ may be kept within such a range. Further, in order to prevent a decrease in the dynamic effect of the supplied air due to the resistance of air cleaner etc., it is necessary to provide a surge tank between each air intake manifold and the air cleaner. An experimental result that the minimum required volume of the surge tank may correspond to the total exhaust volume of the engine was obtained.

If and when the inertia supercharger with the air intake manifold, the length of which is determined by the above-mentioned formula, is fitted to the air intake ports of the engine, its volumetric efficiency can be remarkably improved near the number of revolutions of the engine tuned with the supercharger as compared with those of air intake manifolds normally used thereby enabling a substantially improved supercharging efficiency to be obtained. Conventional inertia superchargers have been disadvantageous in that because air intake manifolds used therein are in the form of straight pipes and surge tanks are connected to the leading ends of the manifolds and hence the assemblies project considerably to the side of the engine thereby interfering sometimes with the installation of other machines and equipments and spaces for installing the inertia superchargers must be secured in advance.

In order to eliminate such disadvantages, a countermeasure was taken as a trial by using bent pipes as the air intake manifold. However, in the case of construction vehicles each having a comparatively low speed engine mounted thereon which requires an intake manifold longer than those of high speed engines, a difficulty has been encountered that even if the air intake manifold in the form of bent pipes are employed it contacts with the bonnet in some cases.

SUMMARY OF THE INVENTION

It is therefore an object of the present invention to provide an improved inertia supercharger which is compact in size yet is able to provide an efficient supercharging effect.

Another object of the present invention is to provide an inertia supercharger having a spiral intake manifold mounted along the inner periphery of a surge tank.

In accordance with an aspect of the present invention, there is provided an inertia supercharging apparatus for an internal combustion engine, comprising: a cylinder head of the engine, said cylinder head having formed therein a plurality of intake ports; a surge tank; and a plurality of spiral pipes each mounted along an inner periphery of said surge tank and having one end open within said surge tank and the other end protruding out of said surge tank and connected to the respective intake ports of said cylinder head.

The above and other objects, features and advantages of the present invention will be readily apparent from the following description taken in conjunction with the accompanying drawings.

DESCRIPTION OF THE PREFERRED EMBODIMENT

Figure 1:
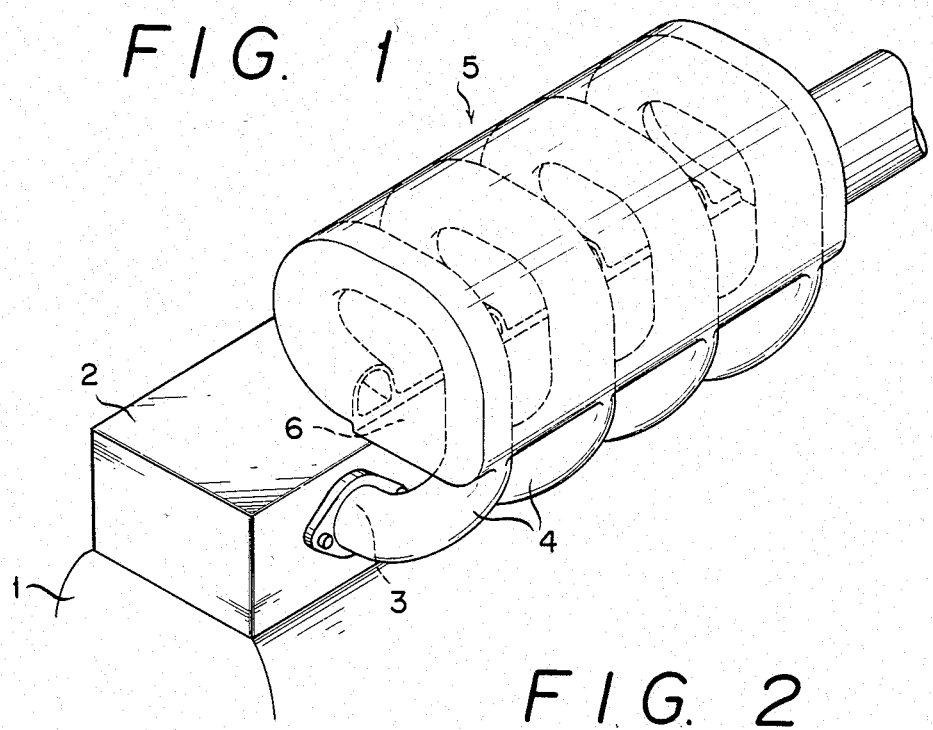
FIG. 1 is a perspective view of an inertia supercharger according to the present invention.
Figure 2:
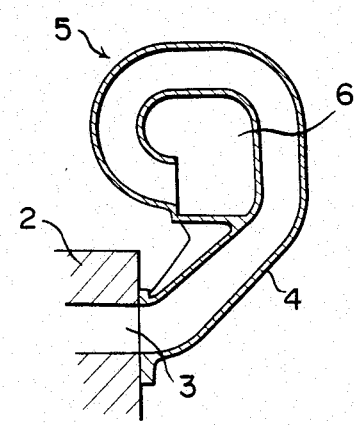
FIG. 2 is a cross-sectional view thereof.

The present invention will now be described in detail below by way of example only with reference to the accompanying drawings.

In the drawings, reference numeral 1 denotes an internal combustion engine having, for example, four cylinders with its cylinder head 2 having four air intake ports 3 formed in one side face thereof. Connected to each air intake port 3 is the leading end of each air intake pipe 4. Reference numeral 5 indicates an inertia supercharger which comprises a barrel-shaped surge tank 6 capable of providing a damping volume and air intake pipes 4 wound around the inner periphery of the surge tank 6 as shown, one end of each pipe 4 opening into the surge tank 6. Each air intake pipe 4 extends around the inner periphery of the surge tank 6 and projects from the lower end thereof and then, its leading end is connected to each of air intake ports 3 formed in the cylinder head 2.

Figure 3:
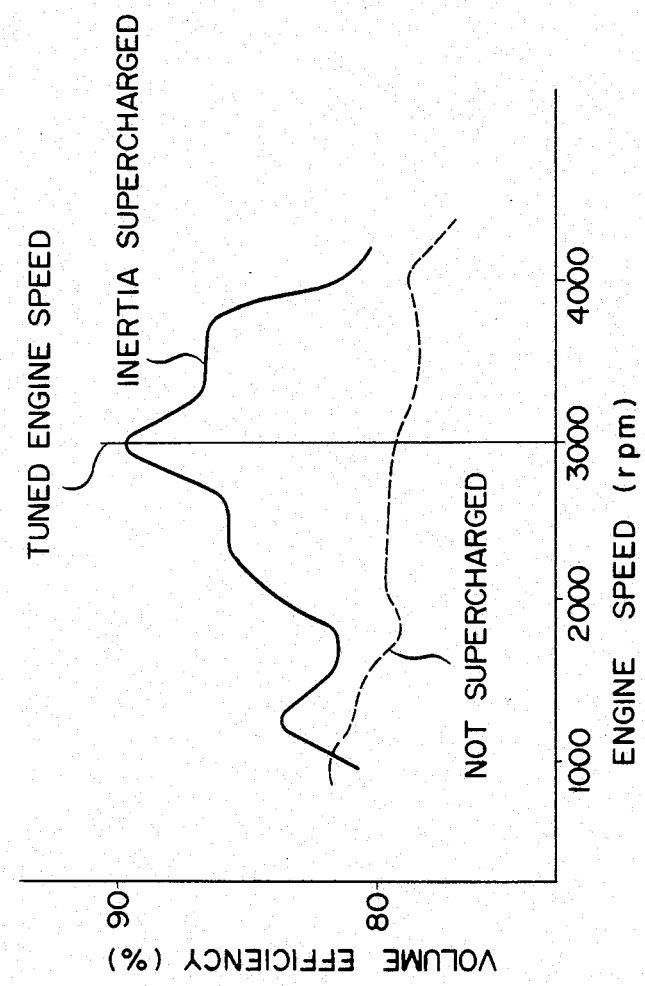
FIG. 3 is a diagram showing how the volume efficiency is changed in accordance with engine speed.

Referring to FIG. 3, there is shown a comparison between the volumetric efficiency of an inertia supercharged engine of the present invention as the rotational speed of the engine is changed and that of the non-inertia supercharged engine under the same condition. It can be seen from this diagram that the inertia supercharged engine according to the present invention has a volumetric efficiency far superior to that of the noninertia supercharged engine.

As mentioned in detail hereinabove, according to the present invention, the air intake pipes 4, each having one end opening into the surge tank 6, extend around the inner periphery of the surge tank and then project from the lower end thereof and the other end of each pipe 4 is connected to the respective air intake ports 3 formed in the engine's cylinder head.

Therefore the overall size of the supercharger can be reduced remarkably as compared with that of the conventional type supercharger wherein the air intake manifold is not mounted the surge tank. For this reason, the supercharger can be fitted to the engine 1 without requiring a large space and also there is no possibility of occurrence of its contact with the bonnet upon installation. Further, because the required length of the air intake pipes can be secured by coiling them around the inner periphery of the surge tank 6, there is no risk of deteriorating the inertia supercharging efficiency in spite of the compact overall size thereof.

What is claimed is:

1. An inertia supercharging apparatus for a comparatively low speed internal combustion engine having cylinders within a cylinder head with a plurality of air intake ports formed therein, said supercharging apparatus comprising:

a generally barrel shaped surge tank having a substantially cylindrical peripheral surface enclosing an interior volume and having an air intake thereto; and a plurality of spaced apart pipes each having two ends, each pipe having one of said ends open within said surge tank and extending spirally along the inside of said peripheral surface of said surge tank for most of its circumference, said pipes having their other of said ends projecting out of said surge tank through said peripheral surface and connected to respective air intake ports of said cylinder head, said pipes having spaces between them within said surge tank which are unobstructedly open to and form part of said interior volume of said surge tank, wherein said air intake ports are fitted with an air intake manifold consisting of said surge tank and said plurality of pipes, and the diameter of said surge tank is selected so that said pipes will have a length to approximately satisfy the formula:

$$\gamma = \frac{a}{2\pi} \sqrt{\frac{F_{pip}}{V_h \times l}}$$

wherein $\gamma$ is the frequency of air supplied into the intake manifold, a is the velocity of sound in the supplied air, $F_{pip}$ is an inner sectional area of the surge tank of the air intake manifold, $V_h$ is the effective cylinder volume, and 1 is the length of air travel through the air intake manifold including the air intake ports thereof.

2. An inertial supercharging apparatus as claimed in claim 1, further comprising an air cleaner positioned before the air intake to said surge tank, and wherein the volume of said surge tank corresponds to that of total exhaust of said engine.

* * * * *